United States Patent [19]

Takei et al.

[11] Patent Number: 4,494,943
[45] Date of Patent: Jan. 22, 1985

[54] POWER TRANSMISSION DEVICE FOR VEHICLES

[75] Inventors: Toshihiro Takei; Takahiro Goshima, both of Kariya; Yoshiyuki Hattori, Toyoake; Kazuma Matsui, Toyohashi, all of Japan

[73] Assignee: Nippondenso Co., Ltd., Kariya, Japan

[21] Appl. No.: 414,579

[22] Filed: Sep. 3, 1982

[30] Foreign Application Priority Data

Sep. 8, 1981 [JP] Japan ................................ 56-141269
Sep. 8, 1981 [JP] Japan ................................ 56-141270

[51] Int. Cl.³ ............................................. F16H 55/52
[52] U.S. Cl. ........................................ 474/28; 474/18; 74/752 C
[58] Field of Search ................... 474/28, 18, 12, 13, 474/16; 74/752 C

[56] References Cited

U.S. PATENT DOCUMENTS 4,228,691 10/1980 Smirl ................................ 474/28 X
4,403,974 9/1983 Sherman et al. .................. 474/18 X

FOREIGN PATENT DOCUMENTS 2087004 5/1982 United Kingdom ................ 474/28

Primary Examiner—James A. Leppink
Assistant Examiner—Thuy M. Bui
Attorney, Agent, or Firm—Cushman, Darby & Cushman

[57] ABSTRACT

A power transmission device for vehicles comprises: a housing rotatably supporting a crank shaft of an engine of the vehicle; a first shaft rotatably supported inside the housing to be coaxial with the crank shaft; a clutch unit having a drive member arranged inside the housing and coupled to the crank shaft, and a driven member fixed to the first shaft; a second shaft rotatably supported inside the housing to be parallel to the first shaft. The device has also infinite variable transmission including a drive pulley consisting of a fixed sheave and an axially movable sheave mounted on the first shaft, a driven pulley consisting of a fixed pulley and an axially movable sheave mounted on the second shaft, and a V belt which is placed the driving and driven pulleys through V grooves defined by the fixed and axially movable sheaves of the driving and driven pulleys. Hydraulic piston-cylinder assemblies are fixed to the axially movable sheaves and to the associated first and second shafts so that they move the axially movable sheaves towards and away from the associated fixed sheaves. A rotary pump is disposed at the housing has a rotary element operatively coupled to the crank shaft for rotation therewith to generate a hydraulic pressure upon rotation, and which supplies the hydraulic pressure to the hydraulic piston-cylinder assemblies.

17 Claims, 7 Drawing Figures

POWER TRANSMISSION DEVICE FOR VEHICLES

BACKGROUND OF THE INVENTION

The present invention relates to a power transmission device for vehicles, which transmits a rotaion of a vehicle engine to vehicle driving wheels through an endless belt type infinite variable transmission which uses a clutch unit and hydraulic pressure-controlled speed variable pulleys.

A conventional power transmission device for vehicles with engines including automobiles comprises a magnetic clutch coupled to an engine crank shaft, an infinite variable transmission of a speed variable pulley type coupled to the magnetic clutch and having an endless steel belt, and a gearing for coupling the infinite variable transmission to the driving wheels.

In the conventional power transmission device of this type, a hydraulic device is arranged at a side of one of a pair of drive sheaves for a drive pulley to make them to approach or separate from each other and another hydraulic device is prepared at a side of one of a pair of driven sheaves for a driven pulley to make them approach or separate from each other. A V belt passes through the V-shaped grooves defined between the driving sheaves and between the driven sheaves. The hydraulic device adjusts the groove width of each pulley in accordance with the hydraulic pressure produced in the hydraulic device. With this adjustment, the diameter of a belt wound about the drive and driven pulleys is varied to achieve infinite variable transmission. A hydraulic pump is required to drive the hydraulic devices. The hydraulic pump may be driven by an electric motor. However, in this case, an electric motor must be incorporated in addition to the hydraulic pump, which will increase the cost and volume of the power transmission device. In order to avoid this, the hydraulic pump is driven by power from the engine. In order to always drive the hydraulic pump by power from the engine, the power from the engine is supplied from a rotating part (that is, rotary part at the engine side) between the clutch and the engine. A gearing and a combination of pulleys and a belt are generally used as an intermediate means for transmitting power from the engine. However, they also increase the cost of the device and render the device bulky due to the increased space required. The use of the intermediate means tends to cause power loss.

SUMMARY OF THE INVENTION

It is an object of the present invention to provide a power transmission device for vehicles, wherein power transmission from the rotating part at the engine side to a hydraulic pump for adjusting the groove gaps of drive and driven pulleys is simple, power loss is small, and the dead space is eliminated.

In order to achieve the above object of the present invention, there is provided a power transmission device for vehicles, comprising a housing for rotatably supporting a crank shaft of an engine of the vehicle; a first shaft rotatably supported inside the housing to be coaxial with the crank shaft; a clutch unit having a drive member arranged inside the housing and coupled to the crank shaft and a driven member fixed to the first shaft; a second shaft rotatably supported inside the housing to be parallel to the first shaft; a drive pulley comprising a fixed sheave secured to the first shaft and a movable sheave axially movably mounted on the first shaft; a driven pulley comprising a fixed pulley secured to the second shaft and a movable sheave axially movably mounted on the second shaft; a V belt placed on the driving and driven pulleys though V grooves defined by the fixed and movable sheaves of the driving and driven pulleys; hydraulic piston-cylinder assemblies which are fixed to the movable sheaves and to the corresponding first and second shafts and which move the movable sheaves toward and away from the corresponding fixed sheaves; and a rotary pump which is disposed at the housing, which has a rotary element operatively coupled to the crank shaft for rotation therewith to generate a hydraulic pressure upon rotation, and which supplies the hydraulic pressure to the hydraulic piston-cylinder assemblies.

BRIEF DESCRIPTION OF THE DRAWINGS

This invention will be fully understood from the following detailed description with reference to the accompanying drawings in which.

DETAILED DESCRIPTION OF THE PREFERRED EMBODIMENTS

Figure 1:
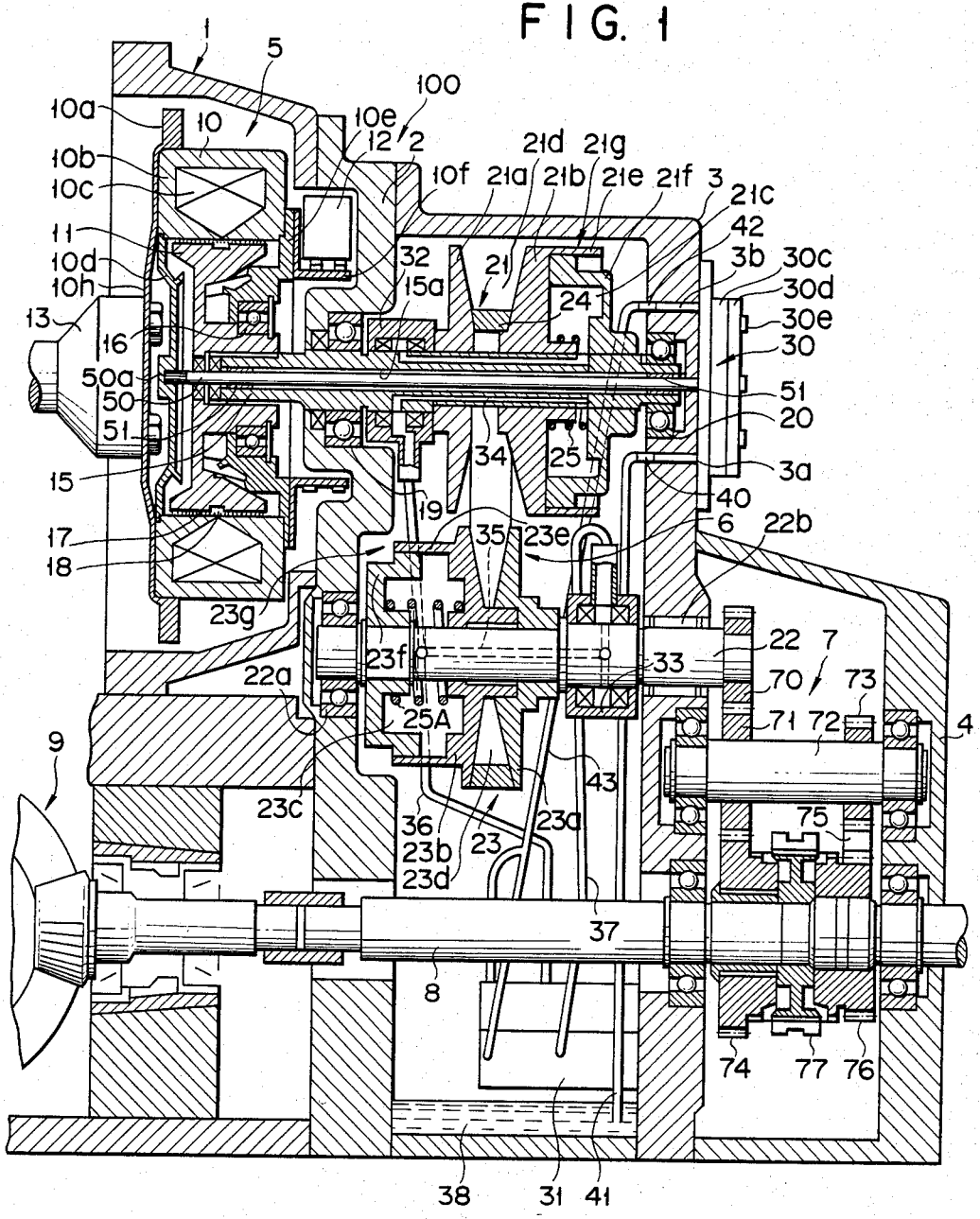
FIG. 1 is an axial cross-sectional view of the first embodiment according to this invention.

Same and like reference numerals denote the same and like parts throughout the drawings. A description made of the parts of one embodiment will therefore be omitted for the same parts of subsequent embodiments.

Figure 2:
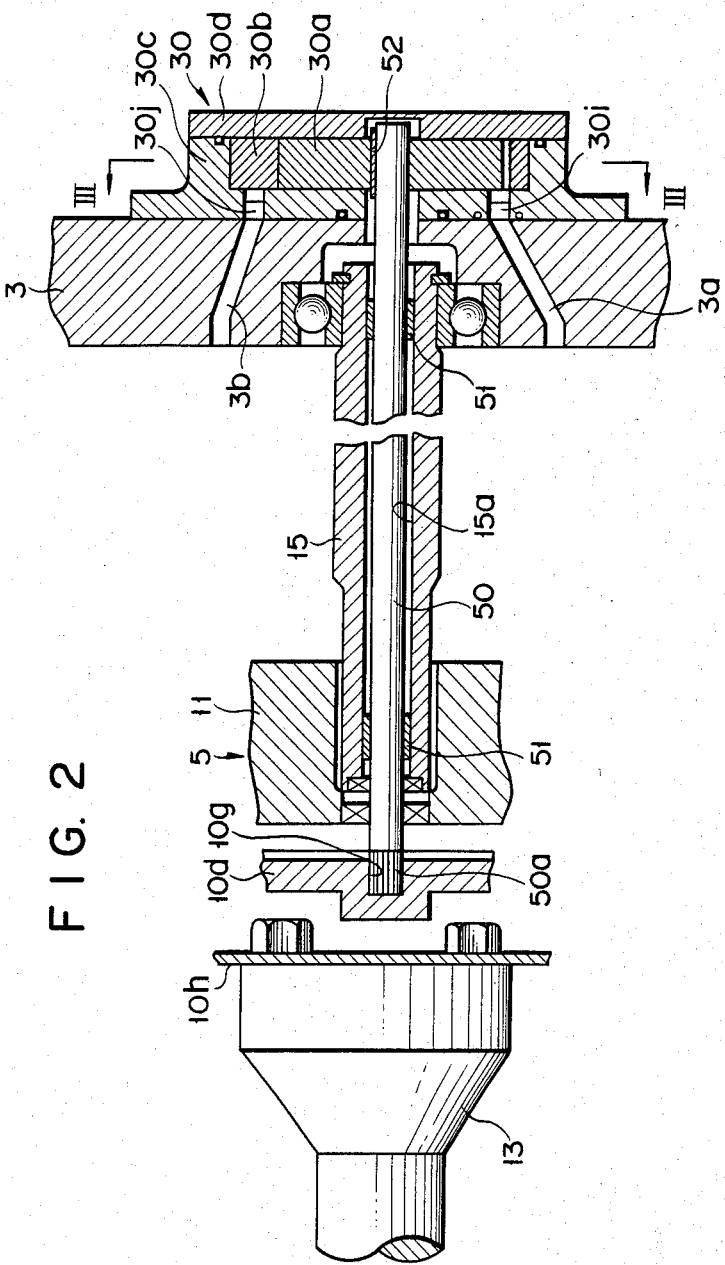
FIG. 2 shows a longitudinal cross sectional view of the main part of FIG. 1.
Figure 3:
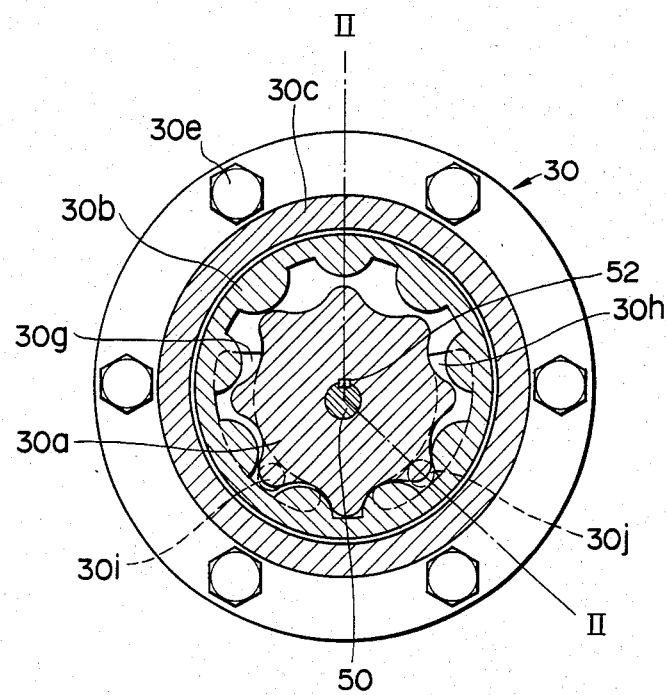
FIG. 3 shows a transverse cross-sectional view, taken along the line III—III in FIG. 2, of a hydraulic pump used in the first embodiment of this invention.

FIGS. 1 to 3 show the first embodiment of the present invention.

Referring to FIG. 1, a power transmission device for vehicles has a housing generally designated at 100. The housing 100 comprises a clutch housing 1, a transmission housing 2, a transmission casing 3, and a gear unit casing 4, which are arranged in order from the left-hand side to the right-hand side in FIG. 1. A clutch unit 5 is provided inside the clutch housing 1. An endless belt type infinite variable transmission 6 is disposed in a space defined by the transmission housings 2 and 3. A gear unit 7 for switching between the forward drive, neutral and reverse drive of the vehicle is prepared inside the gear unit casing 4. The gear unit 7 is coupled to a differential 9 outside the housing 100 by an output shaft 8 extending through the housing 100. The clutch unit 5 is a powder magnetic clutch and comprises a drive member 10, a driven member 11 and a brushing 12 adjacent to one side end of each of the members 10 and 11.

The drive member 10 comprises a ring-shaped yoke 10b, a coil 10c housed therein, a side plate 10d which is fixed to that side of the yoke 10b which is opposite to the brush 12 and which also functions as a labyrinth seal, a holder 10e which is arranged at said one side end of the drive member 10, and a slip ring 10f which slides on the side end face thereof. The drive member 10 is fixed to the free end of a crank shaft 13 for rotation therewith by the flange portion 10a of a coupling disk 10h fixed to the free end of the crank shaft 13.

The cylindrical driven member 11 is coaxially disposed inside the drive member 10 and is coaxially fixed to an input shaft 15 which is aligned with the crank shaft 13. The holder 10e of a disc shape is coaxially placed on the driven member 11 through ball bearings 16 and is rotated by the drive member 10. An annular gap 17 is defined between the inner face of the yoke 10b and the outer face of the driven member 11. Powdered paramagnetic substance 18 is filled in this annular gap 17. Inside the housing 100, the horizontal input shaft 15 is supported by ball bearings 19 and 20 in the transmission housing 2 and the transmission casing 3. A horizontal intermediate shaft 22 is supported by ball bearings 22a and roller bearings 22b in the transmission housing 2 and the transmission casing 3 in a manner parallel to the input shaft 15. A drive pulley 21 and a driven pulley 23 constituting the endless belt type infinite variable transmission 6 are respectively arranged on the input shaft 15 and the intermediate shaft 22. The drive pulley 21 comprises a fixed sheave 21a which is fixed at the central portion thereof to the input shaft 15 and an movable sheave 21b which is axially movably mounted at the central portion thereof on the input shaft 15 and which can approach or separate from the fixed sheave 21a. The driven pulley 23 similarly comprises a fixed sheave 23a which is fixed at the central portion thereof to the intermediate shaft 22, and an movable sheave 23b which is axially movably mounted at the central portion thereof on the intermediate shaft 22 and which can approach or separate from the fixed sheave 23a. A steel V belt 24 is placed on the drive pulley 21 and the driven pulley 23 through a V groove 21d defined between the sleeves 21a and 21b of the drive pulley 21 and through a V groove 23d defined between the sleeves 23a and 23b of the driven pulley 23. The V belt 24 transmits rotation of the drive pulley 21 to the driven pulley 23.

A cylinder 21e coaxial with the input shaft 15 is mounted on the movable sheave 21b of the drive pulley 21, and a piston 21f surrounding the input shaft 15 is fitted in the cylinder 21e. The piston 21f and the cylinder 21e constitute a piston-cylinder assembly 21g. An oil chamber 21c is defined between the piston 21f and the cylinder 21e. An expansion coil spring 25 disposed inside the chamber 21c surrounds the hub of the movable sheave 21b, which hub projects into the interior of the cylinder 21e. One end of the expansion coil spring 25 is fixed to the inner face of the cylinder 21e, while the other end thereof is fixed to the inner face of the piston 21f. The spring 25 normally urges the movable sheave 21b away from the fixed sheave 21a and thus serves as a return spring.

In a similar manner, a cylinder 23e coaxial with the intermediate shaft 22 is mounted on the movable sheave 23b of the driven pulley 23, and a piston 23f surrounding the intermediate shaft 22 is fitted in the cylinder 23e. The piston 23f and the cylinder 23e constitute a piston-cylinder assembly 23g. An oil chamber 23c is defined between the piston 23f and the cylinder 23e. An expansion coil spring 25A disposed inside the chamber 23c surrounds the hub of the axially movable sheave 23b, which hub projects into the interior of the cylinder 23e. One end of the expansion coil spring 25A is fixed to the inner face of the cylinder 23e, while the other end thereof is fixed to the inner face of the piston 23f. The spring 25A normally urges the axially movable sheave 23b away from the fixed shave 23a and serves as a return spring.

The widths of the grooves 21d and 23d of the pulleys 21 and 23, respectively, are controlled such that one of them increases as the other decreases by controlling the hydraulic pressures in the oil chambers 21c and 23c supplied by a hydraulic pump 30 through a servo valve 31 to be described later.

Oil conducting units 32 and 33 are mounted on the input shaft 15 and the intermediate shaft 22, respectively, and communicate with the oil chambers 21c and 23c through oil passages 34 and 35 in the input shaft 15 and the intermediate shaft 22, respectively. The oil conducting units 32 and 33 communicate with the servo valve 31 through pipes 36 and 37, respectively. The servo valve 31 is mounted within the transmission casing 3 and its change-over operation is controlled by an electronic control unit (not shown). The bottom of the transmission casing 3 defines an oil reservoir 38.

The gear unit 7 has an input gear 70 fixed to one end of the intermediate shaft 22, and a forward counter gear 71 meshing therewith. The forward counter gear 71 and a reverse counter gear 73 are fixed onto a counter shaft 72 which is parallel to the intermediate shaft 22. A forward gear 74 which meshes with the forward counter gear 71, and a reverse gear 76 which meshes with the reverse counter gear 73 through an idling gear 75 are mounted on the output shaft 8. A synchromesh mechanism is interposed between the gears 74 and 76, and its sleeve 77 engages with one of the gears 74 and 76 so as to perform gear shift for transmitting power from the intermediate shaft 22 to the output shaft 8.

The hydraulic pump 30 is mounted on that portion of the outer face of the transmission casing 3 which is opposite to the crank shaft 13. In this embodiment, the hydraulic pump 30 comprises a trochoid pump. As shown in FIG. 3, the trochoid pump comprises an inner external gear 30a, an outer internal gear 30b surrounding it, a pump housing 30c surrounding the gears 30a and 30b, and a side cover 30d (FIG. 2). The pump housing 30c is fixed to the transmission casing 3 by bolts 30e, and the side cover 30d is mounted on the pump housing 30c. The inner external gear 30a is eccentric with respect to the outer internal gear 30b. Referring to FIG. 1, the inner gear 30a is coaxially coupled to a pump drive shaft 50. The pump drive shaft 50 is loosely fitted inside a bore 15a formed in the input shaft 15 to be coaxial therewith. The pump drive shaft 50 is rotatably held relative to the input shaft 15 by metal bearings 51. One end of the pump drive shaft 50 which is at the side of the crank shaft 13 has a serrated portion 50a which is inserted into a serrated hole 10g formed in the side plate 10d of the clutch unit 5 so that the pump drive shaft 50 rotates with the side plate 10d by the crank shaft 13. The other end of the pump drive shaft 50 extends through the transmission casing 3 in the pump housing 30c and is coupled to the inner external gear 30a through a key 52 (FIG. 3).

As shown in FIG. 3, an intake groove 30g and a discharge groove 30h are formed in the inner face of the end wall of the pump housing 30c, and an intake port 30i and a discharge port 30j communicate with the grooves 30g and 30h, respectively. The intake port 30i and the discharge port 30j communicate with an intake passage 3a and a discharge passage 3b, respectively, formed in the wall of the transmission casing 3 (FIG. 2). The intake passage 3a communicates with an intake pipe 41 through a joint 40. The intake pipe 41 communicates with the oil reservoir 38. The discharge passage 3b communicates with a discharge pipe 43 through another joint 42, and this discharge pipe 43 communicates with the servo valve 31.

The mode of operation of the power transmission device of the construction as described above will now be described.

When the engine is driven to rotate the crank shaft 13, the drive member 10 of the clutch unit 5 is rotated. In response to an instruction from the electronic control device (not shown), a current flows to the coil 10c from the brushing 12 through the slip ring 10f. When the electromagnetic force of the coil 10c is varied in accordance with the current, rotation of the yoke 10b of the drive member 10 is transmitted to the driven member 11 through the powdered paramagnetic material 18. Then, the driven member 11 starts rotating and finally rotates together with the drive member 10. Rotation of the driven member 11 is transmitted to the drive pulley 21 of the infinite variable transmission 6 through the input shaft 15, and is transmitted to the driven pulley 23 through the V belt 24. The intermediate shaft 22 is rotated at a speed which corresponds to the transmission gear ratio of the infinite variable transmission 6. The intermediate shaft 22 rotates the counter shaft 72 through the input gear 70 and the forward counter gear 71. Therefore, the forward gear 74 is rotated by the forward counter gear 71 at a predetermined transmission gear ratio, and the reverse gear 76 is rotated by the reverse counter gear 73 and the idling gear 75 also at a predetermined transmission gear ratio.

By axially moving the sleeve 77 of the synchromesh mechanism by a control lever (not shown), coupling between the forward gear 74 and the output shaft 8 or coupling between the reverse gear 76 and the output shaft 8 is selected, so that the output shaft 8 rotates in the forward or reverse direction, respectively. The rotational force of the output shaft 8 is transmitted to the differential 9. The driving conditions such as the engine speed, crank angle, throttle opening, temperatures of various parts (water temperature, exhaust gas temperature and so on) and the vehicle speed are sensed by corresponding sensors. The sensor data is subjected to processing by an electronic control device. The optimal transmission gear ratio of the infinite variable transmission is selected according to the processing result. The electronic control device actuates the servo valve 31 to adjust the hydraulic pressure and flow rate of the oil supplied from the hydraulic pump 30. The adjusted hydraulic pressure and oil flow rate determine the hydraulic pressure in the oil chambers 21c and 23c through the oil conducting units 32 and 33. The movable pulleys 21b and 23b of the drive and driven pulleys 21 and 23 are axially moved in accordance with the hydraulic pressure and flow rate of the oil so as to change the groove widths of the grooves 21d and 23d. As a result, the pulley diameters are changed to control the transmission gear ratio of the infinite variable transmission 6. Automatic control of the transmission gear ratio as described above continuously provides an optimal transmission ratio in accordance with the travelling conditions of the vehicle, so that better fuel mileage may be achieved.

Since the hydraulic pump 30 supplies oil to the infinite variable transmission 6, the hydraulic pump 30 must be driven even if the clutch unit 5 is disengaged. The pump drive shaft 50 coupled to the inner gear 30a of the hydraulic pump 30 extends through the input shaft 15 to engage with the drive side of the clutch unit 5, that is, with the side plate 10d. Accordingly, the hydraulic pump 30 is rotated together with the drive member 10. In other words, the inner external gear 30a of the hydraulic pump 30 is continuously rotated by the crank shaft 13 independently of whether or not the clutch unit 5 is being coupled thereto.

Upon rotation of the inner external gear 30a, the hydraulic pump 30 sucks oil from the oil reservoir 38 through the intake pipe 41, the joint 40, the intake passage 3a, the intake port 30i and the intake groove 30g. The oil is then pressurized in the pump 30 to be supplied to the servo valve 31 through the discharge groove 30h, the discharge port 30j, the discharge passage 3b, the joint 42, and the discharge pipe 43.

Since the pump drive shaft 50 is in the input shaft 15, extra space for guiding the pump drive shaft 50 to the drive member 10 is not required. In addition, since the pump drive shaft 50 is in the input shaft 15, the pump drive shaft 50 need not be particularly thick in order to assure the mechanical strength.

Since the hydraulic pump 30 is mounted on the outer face of the transmission housing 3, only a space to accommodate the pump main body is required, and maintenance is easy.

Figure 4:
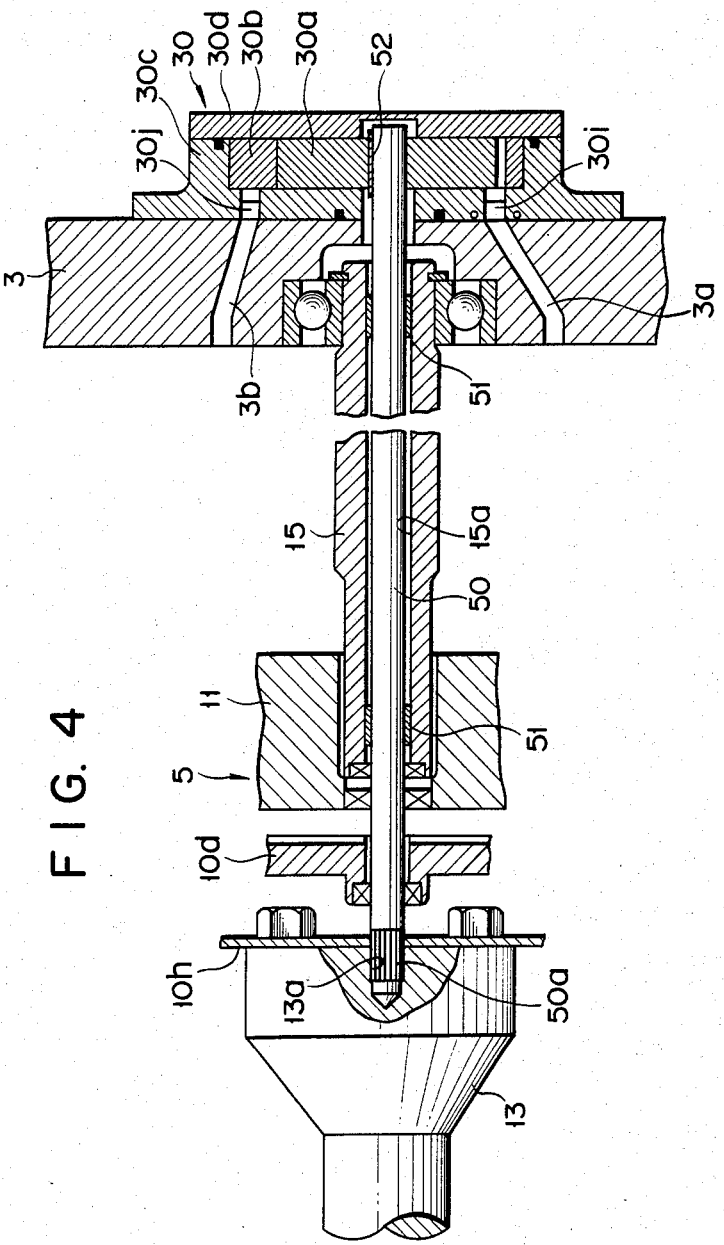
FIG. 4 shows a cross-sectional view of the main part of the second embodiment of the present invention which is modified from the first embodiment.

In the embodiment described above, the pump drive shaft 50 is coupled to the drive member 10 of the clutch unit 5. However, in a second embodiment of the second embodiment as shown in FIG. 4, the pump drive shaft 50 is directly coupled to the crank shaft 13. The pump drive shaft 50 extends through the side plate 10d. The serrated portion 50a formed at that one end of the shaft 50 which is at the side of the crank shaft 13 is fitted in a serrated hole 13a formed at the center of the free end of the crank shaft 13, so that the shaft 50 rotates with the crank shaft 13.

Figure 7:
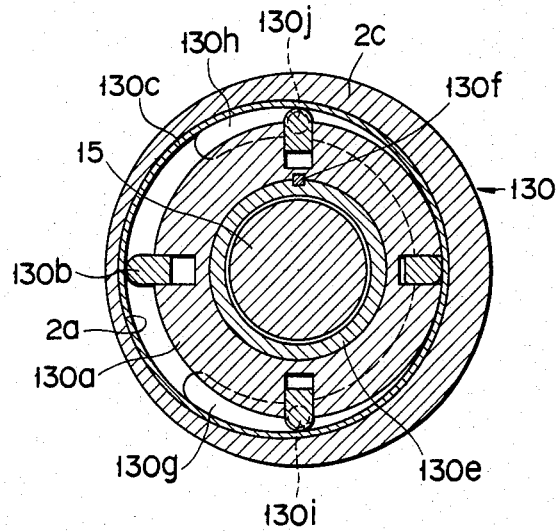
FIG. 7 shows a transverse cross-sectional view of a hydraulic pump used in the third embodiment of this invention.
Figure 5:
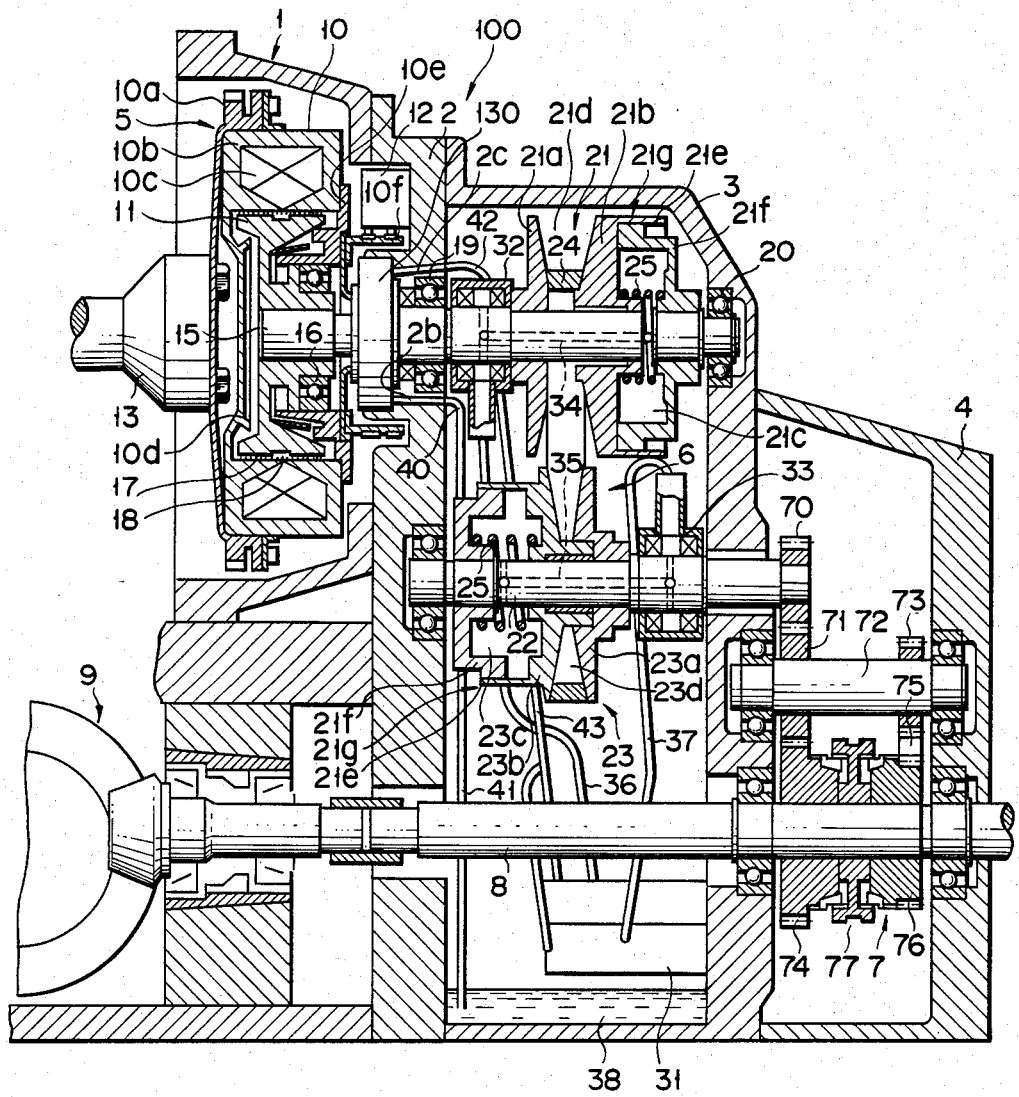
FIG. 5 is an axial cross-sectional view of the third embodiment of the present invention.
Figure 6:
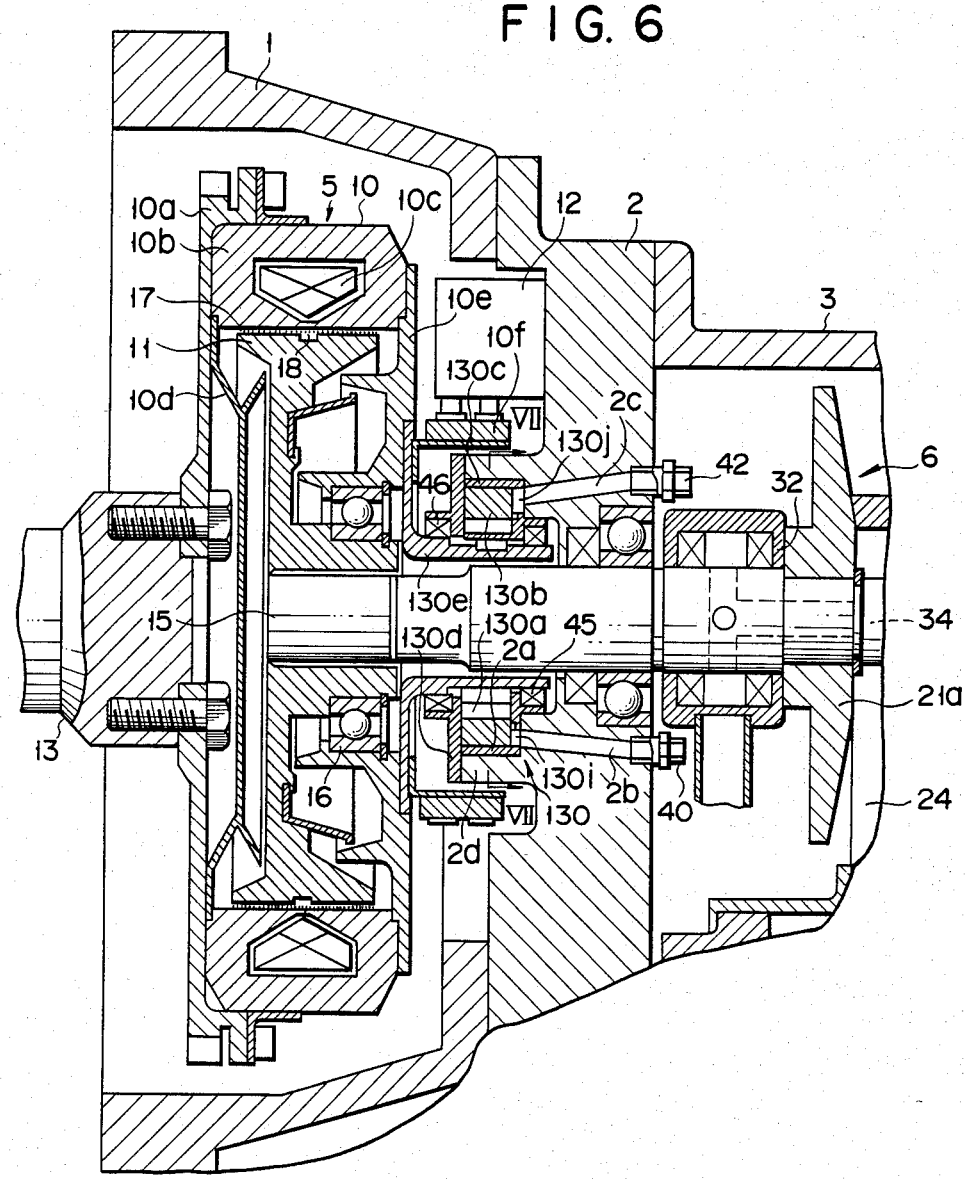
FIG. 6 shows a longitudinal cross-sectional view of the main part of FIG. 5.

FIGS. 5 to 7 show the third embodiment of the present invention. This third embodiment is the same as the first embodiment except for the arrangement and configuration of the hydraulic pump. Therefore, the same reference numerals as those of the first embodiment will denote the same parts in the third embodiment, and a detailed description thereof will be omitted.

A hydraulic pump 130 which is a vane type pump is mounted inside a hub 2d at the center of the transmission housing 2 (FIG. 6). As shown in FIGS. 6 and 7, the hydraulic pump 130 comprises a rotor 130a, a plurality of vanes 130b, a pump housing 130c surrounding the rotor 130a and a sealing plate 130d at one side end of the housing 130c. The rotor 130a is mounted by a key 130f to a hollow cylindrical flange shaft 130e which is fixed by bolts (not shown) to the holder 10e of the drive member 10 of the clutch unit 5, so that the rotor 130a rotates together with the drive member 10. The pump housing 130c is pressed into a recess 2a formed in the hub 2d of the transmission housing 2. The vanes 130b radially reciprocally arranged inside the rotor 130a are in slidable contact with the pump housing 130c at their outer ends. The pump housing 130c is eccentric with respect to the flange shaft 130e. An intake groove 130g and a discharge groove 130h are formed in the inner face of the end wall of the pump housing 130c. An intake port 130i and a discharge port 130j communicate with the grooves 130g and 130h. An intake passage 2b and a discharge passage 2c extend through the wall of the transmission housing 2 to communicate with the intake port 130i and the discharge port 130j (FIG. 6). An intake pipe 41 is coupled to the intake passage 2b through a joint 40, and the lower end of the intake passage 41 communicates with the oil reservoir 38. A discharge pipe 43 also communicates with the discharge passage 2c through another joint 42, and the discharge pipe 43 communicates with the servo valve 31.

The sealing plate 130d closes the open end of the pump housing 130c to form a pump chamber, and is fixed to the transmission housing 2 through bolts (not shown).

Oil leakage from the hydraulic pump 130 is prevented by O-rings 45 and oil seals 46.

When the rotor 130a of the hydraulic pump 130 rotates, the hydraulic pump 130 sucks the oil from the oil reservoir 38 through the intake pipe 41, the joint 40, the intake passage 2b, the intake port 130i, and the intake groove 130g. The oil is then pressurized in the pump 130 to be supplied to the servo valve 31 through the discharge groove 130h, the discharge port 130j, the discharge passage 2c, the joint 42, and the discharge pipe 43. The rest of the mode of operation of this embodiment is the same as that of the first embodiment, and a detailed description thereof will be omitted.

In this embodiment, since the rotor 130a of the hydraulic pump 130 is coupled to the drive member 10 of the clutch unit 5 by the flange shaft 130e, the rotor 130a rotates together with the drive member 10. Therefore, the rotor 130a rotates at the same speed as that of the engine. Since the housing 130c of the hydraulic pump 130 is mounted on that wall of the transmission housing 2 which opposes the clutch unit 5, the pump 130 is disposed close to the clutch unit 5. This facilitates direct drive of the rotor 130a by the drive member 10; the efficiency drop or power loss is reduced to a minimum, since specific gears and/or pulleys are not used in the pump drive path. Furthermore, this results in a smaller number of parts, and hence a simpler construction. The position for the pump housing 130c is the position that would be taken by the brush 12. However, because the position of the brush 12 is slightly deviated radially outwardly, extra space is secured around the input shaft to accommodate the pump housing 130c. Thus, even if the pump 130 is located at this position, a particularly large space is not required, and the overall power transmission device may not become bulky.

Although the pump housing 130c is pressed into the recess 2a formed in the wall of the transmission housing 2, the present invention is not limited to this. For example, the wall of the transmission housing 2 may be machined to form a pump housing directly in the housing 2, and the pump housing 130c may then be omitted.

In the embodiments described above, trochoid pumps or vane pumps are used as hydraulic pumps. However, the internal gear pumps may alternatively be used.

The present invention is not limited to the hydrualic pumps, and may be applied to compressors or vacuum pumps for vehicles.

Moreover, the inner gear 30a and the rotor 130a constitute the rotary element of the pump.

What we claim is:

1. A power transmission device for vehicles, comprising:
   a housing rotatably supporting a crank shaft of an engine of the vehicle;
   a first shaft rotatably supported inside said housing to be coaxial with said crank shaft;
   a clutch unit having a drive member arranged inside said housing and coupled to said crank shaft, and a driven member fixed to said first shaft;
   a second shaft rotatably supported inside said housing to be parallel to said first shaft;
   infinite variable transmission including a drive pulley having a fixed sheave secured to said first shaft and a movable sheave axially movable mounted on said first shaft, a driven pulley having a fixed sheave secured to said second shaft and a movable sheave axially movably mounted on said second shaft, and a V belt which is placed on said drive and driven pulleys through V grooves defined by said fixed and axially movable sheaves of said drive and driven pulleys;
   hydraulic piston-cylinder assemblies which are fixed to said movable sheaves and to said first and second shafts associated therewith and which move said movable sheaves towards and away from said fixed sheaves associated therewith;
   a rotary hydraulic pump which is disposed at said housing, which has a rotary element to generate a hydraulic pressure upon rotation, and which supplies the hydraulic pressure to said hydraulic piston-cylinder assemlbies; and
   a third shaft passing through said first shaft and having one end connected to said crank shaft and the other end connected to said rotary element of said rotary hydraulic pump.

2. A device according to claim 1, wherein a pump drive shaft is inserted into said first shaft to be coaxial therewith, one end of said pump drive shaft being fixed to said rotary element, and the other end thereof being operatively coupled to said crank shaft.

3. A device according to claim 2, wherein said the other end of said pump drive shaft is coupled to said drive member.

4. A device according to claim 3, wherein said clutch unit has a side plate which fixes said crank shaft to said drive member, said the other end of said pump drive shaft being fixed to said side plate.

5. A device according to claim 2, wherein said the other end of said pump drive shaft is directly fixed to said crank shaft.

6. A device according to claim 1, wherein said rotary hydraulic pump is arranged on an outer wall of said housing which is opposite to said crank shaft.

7. A device according to claim 1, wherein said rotary hydraulic pump is fixed inside said housing, and said rotary element is coupled to said drive member.

8. A device according to claim 7, wherein said rotary hydraulic pump is arranged adjacent to said drive member.

9. A device according to claim 8, wherein said clutch unit has a holder which rotates with said drive member and which is interposed between said drive and driven members, and said rotary element of said rotary hydraulic pump is fixed to said holder.

10. A power transmission device for vehicles, comprising:
   a housing rotatably supporting a crank shaft of an engine of the vehicle;
   a first shaft rotatably supported inside said housing to be coaxial with said crank shaft;

a clutch unit having a drive member arranged inside said housing and coupled to said crank shaft, and a driven member fixed to said first shaft;

a second shaft rotatably supported inside said housing to be parallel to said first shaft;

infinite variable transmission including a drive pulley having a fixed sheave secured to said first shaft and a movable sheave axially movably mounted on said first shaft, a driven pulley having a fixed sheave secured to said second shaft and a movable sheave axially movably mounted on said second shaft, and a V belt which is placed on said drive and driven pulleys through V grooves defined by said fixed and axially movable sheaves of said drive and driven pulleys;

hydraulic piston-cylinder assemblies which are fixed to said movable sheaves and to said first and second shafts associated therewith and which move said movable sheaves towards and away from said fixed sheaves associated therewith;

a rotary hydraulic pump which is disposed at said housing, which has a rotary element operatively coupled to said crank shaft for rotation therewith to generate a hydraulic pressure upon rotation, and which supplies the hydraulic pressure to said hydraulic piston-cylinder assemblies; and a pump drive shaft inserted into said first shaft to be coaxial therewith, one end of said pump drive shaft being fixed to said rotary element, and the other end thereof being operatively coupled to said crank shaft.

11. A device according to claim 10, wherein said the other end of said pump drive shaft is coupled to said drive member.

12. A device according to claim 11, wherein said clutch unit has a side plate which fixes said crank shaft to said drive member, said other end of said pump drive shaft being fixed to said side plate.

13. A device according to claim 10, wherein said other end of said pump drive shaft is directly fixed to said crank shaft.

14. A device according to claim 10, wherein said rotary hydraulic pump is arranged on an outer wall of said housing which is opposite to said crank shaft.

15. A device according to claim 10, wherein said rotary hydraulic pump is fixed inside said housing, and said rotary element is coupled to said drive member.

16. A device according to claim 15, wherein said rotary hydraulic pump is arranged adjacent to said drive member.

17. A device according to claim 16, wherein said clutch unit has a holder which rotates with said drive member and which is interposed between said drive and driven members, and said rotary element of said rotary hydraulic pump is fixed to said holder.

* * * * *